United States Patent
Sheu et al.

(10) Patent No.: US 9,082,019 B2
(45) Date of Patent: Jul. 14, 2015

(54) METHOD OF ESTABLISHING ADJUSTABLE-BLOCK BACKGROUND MODEL FOR DETECTING REAL-TIME IMAGE OBJECT

(71) Applicant: NATIONAL YUNLIN UNIVERSITY OF SCIENCE AND TECHNOLOGY, Douliu, Yunlin County (TW)

(72) Inventors: Ming-Hwa Sheu, Douliu (TW); Wen-Kai Tsai, Douliu (TW); Jian-Hui Chen, Douliu (TW)

(73) Assignee: NATIONAL YUNLIN UNIVERSITY OF SCIENCE AND TECHNOLOGY, Douliu, Yunlin County (TW)

( * ) Notice: Subject to any disclaimer, the term of this patent is extended or adjusted under 35 U.S.C. 154(b) by 110 days.

(21) Appl. No.: 13/918,513

(22) Filed: Jun. 14, 2013

(65) Prior Publication Data
US 2014/0369552 A1 Dec. 18, 2014

(51) Int. Cl.
*G06K 9/00* (2006.01)
(52) U.S. Cl.
CPC ................... *G06K 9/00771* (2013.01)
(58) Field of Classification Search
None
See application file for complete search history.

(56) References Cited

PUBLICATIONS

Wen-kai Tsai; Ming-hwa Sheu; Chung-chi Lin, "Block-Based Major Color Method for Foreground Object Detection on Embedded SoC Platforms," Embedded Systems Letters, IEEE , vol. 4, No. 2, pp. 49,52, May 7, 2012.*

\* cited by examiner

*Primary Examiner* — Nirav G Patel
(74) *Attorney, Agent, or Firm* — Muncy, Geissler, Olds & Lowe, P.C.

(57) ABSTRACT

A method of establishing an adjustable-block background model for detecting a real-time image object is provided to obtain a surveillance image by a surveillance apparatus. The surveillance image has a plurality of pixels. The method includes steps of: segmenting the surveillance image into a plurality of blocks each having a first pixel and at least one second pixel; defining the first pixel as a major color and comparing the first pixel with the at least one second pixel to determine a number and color information of the major color in the block; merging the blocks having the same major color into a large block to obtain a block background model; and performing image comparison to identify a moving object image. With the establishment of the block background model, a required memory space is effectively reduced while outstanding image display performance is still maintained.

6 Claims, 7 Drawing Sheets
(2 of 7 Drawing Sheet(s) Filed in Color)

METHOD OF ESTABLISHING ADJUSTABLE-BLOCK BACKGROUND MODEL FOR DETECTING REAL-TIME IMAGE OBJECT

FIELD OF THE INVENTION

The present invention relates to an image surveillance technique, and particularly to a method of establishing an adjustable-block background model for detecting a real-time image object.

BACKGROUND OF THE INVENTION

A surveillance system essentially involves a moving object detection technique, which is intended to allow the system to more accurately and rapidly detect a moving object. Subsequent operations such as tracking, identification and analysis procedures on the moving object are highly dependent on the accuracy of moving object detection. The accuracy of moving object detection may even be decisive on the reliability and accuracy of the entire system, and is thus a crucial factor for evaluating the quality of a surveillance system.

Numerous publications on the object detection realm have been disclosed. Among the researches, three methods, namely an optical flow method, a frame difference method and a background subtraction method, are most prevalent. In the optical flow method, a motion vector in an image in consecutive frames is identified and characteristic matching is then performed, and is applicable to motion detection and moving object segmentation. Although the optical flow method is extremely effective in applications including pattern recognition and computer vision as well as other image processing applications, the optical flow method falls short in providing a real-time effect due to a high sensitivity on noises in a scene and a huge computation amount resulted by complex algorithm.

In the frame subtraction method, every two pixel values in consecutive frames are subtracted to obtain a difference. The pixel is considered as the background when the difference is smaller than a threshold, or the pixel is considered as a part of a moving object when a large variance exists in the pixel and the difference is greater than the threshold. This method, being quite simple and fast, however frequently obtains only borders of a moving object rather than a complete object.

In the background subtraction method, a background model is first established. The background model is compared with a new image to further obtain a moving object. This method is both simple and fast. Although the concept of the background subtraction method may seem easy, the background subtraction method suffers from many challenging issues. For example, results of segmentation are liable to errors including fragments, high noises and segmentation failures. To prevent the above errors, updating and display capabilities of the background need to be reinforced, which may on the other hand lead to a tremendous load on the system memory and computation performance.

SUMMARY OF THE INVENTION

Therefore the primary object of the present invention is to satisfy requirements of a high background display capability, a low memory capacity and a low system computation load for the background subtraction method.

To achieve the above object, a method of establishing an adjustable-block background model for detecting a real-time image object is provided. It obtains a surveillance image by a surveillance apparatus, and comprises the following steps.

S1: The surveillance image is segmented into a plurality of blocks, each of which comprising a first pixel and at least one second pixel.

S2: A color of the first pixel is selected as a major color, and a difference is determined by comparing the color of the at least one second pixel and the color of the first pixel by an operation processing unit. The color of the at least one second pixel is added to the major color when the difference is greater than a threshold.

S3: The number and color information of the major color of the blocks are determined by the operation processing unit, and stored.

S4: One of the blocks is defined as an initial block, and the initial block and the blocks adjacent to the initial block are jointly defined as a search region. When the number of the major color of the initial block is smaller than a block threshold, the number and color information of the major color in the search region are reorganized and integrated by the operation processing unit.

S5: When the number of major color in the search region is smaller than a region threshold, the search region is merged into a large block.

S6: The analysis on the surveillance image is completed, and steps S4 and S5 are sequentially repeated to obtain a block background model of the surveillance image.

S7: A new surveillance image is inputted from the surveillance apparatus to perform color comparison between the new surveillance image and the block background model, and a moving image object is determined and obtained when a difference of the color comparison is too large.

As seen from the above descriptions, the present invention offers the advantages below. First of all, the major color is utilized as a basis for mutual comparison to reduce system memory capacity load. Secondly, with the determination mechanism of the block threshold and the region threshold, different-sized block background models are established to effectively further reduce the utilization amount of the memory. Moreover, as the load on the memory system is reduced, the computer is allowed to more efficiently perform data computation to enhance computation performance.

The foregoing, as well as additional objects, features and advantages of the invention will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
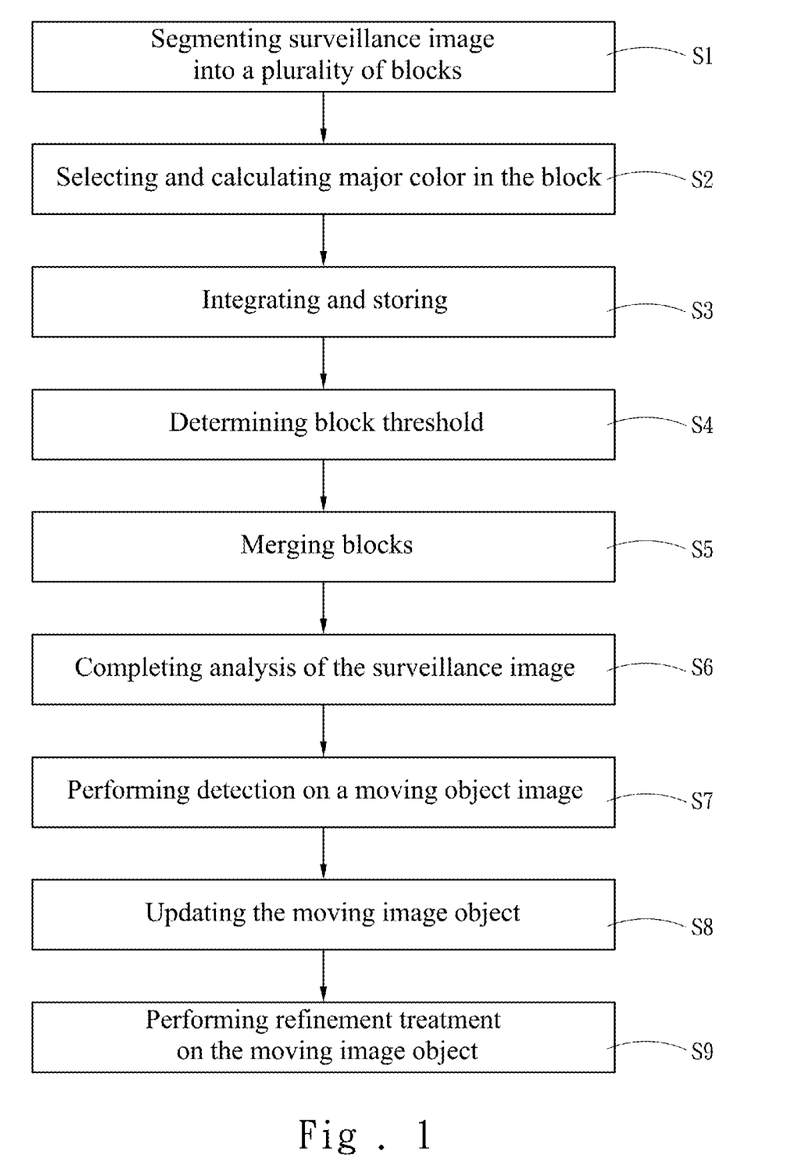
FIG. 1 is a flowchart on the process of the present invention.
Figure 2:
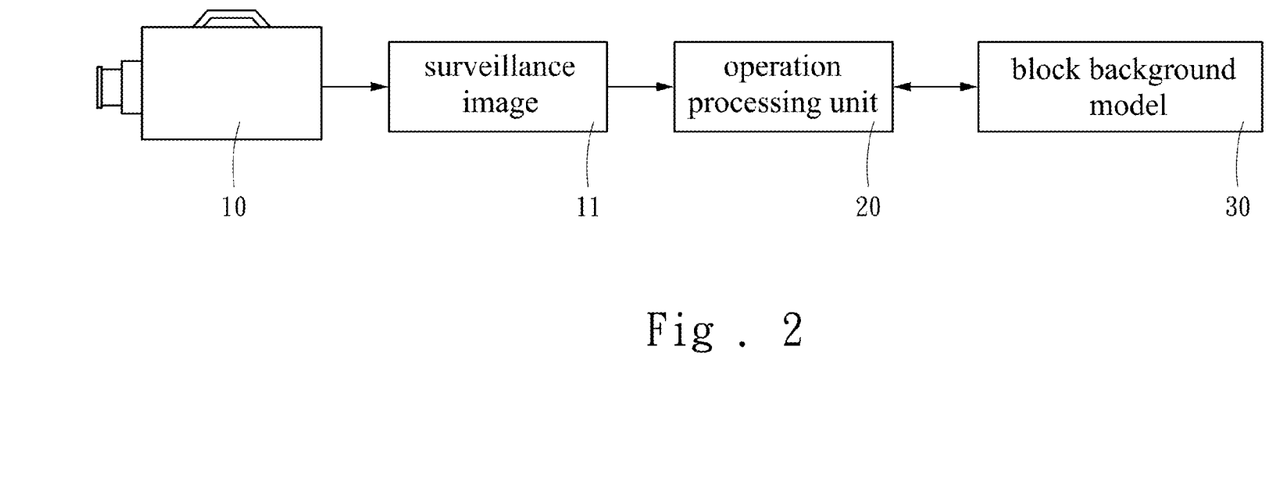
FIG. 2 is a system block diagram of the present invention.
Figure 3:
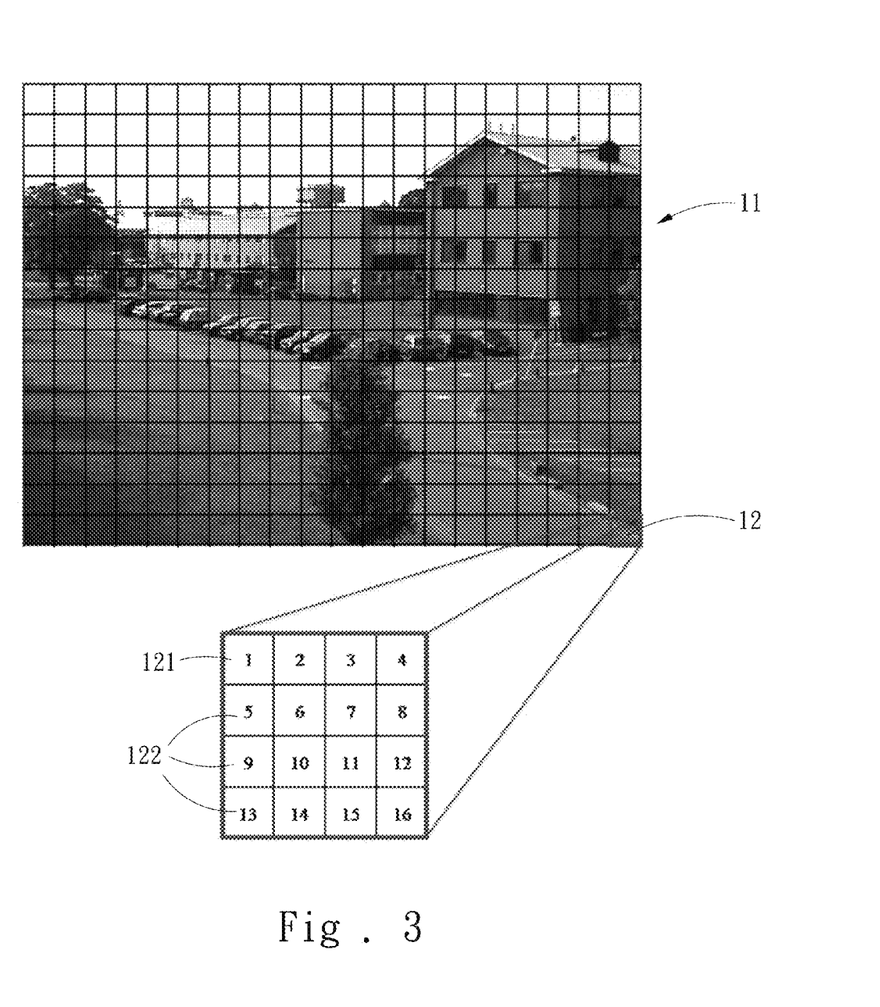
FIG. 3 is a schematic diagram of a block in a surveillance image of the present invention.

Referring to FIGS. 1, 2 and 3, a method of establishing an adjustable-block background model for detecting a real-time image object is provided, which obtains a surveillance image 11 by a surveillance apparatus 10 and comprises the following steps.

In step S1, the surveillance image 11 is segmented into a plurality of blocks 12. Referring to FIG. 3, each of the blocks 12 includes a first pixel 121 and at least one second pixel 122. In the embodiment, each block 12 may include 16 pixels to form a matrix in 4×4 dimensions. One of the 16 pixels may be selected as the first pixel 121, while the remaining pixels may be the second pixels 122.

In step S2, a major color in the blocks 12 is selected and calculated. The color of the first pixel 121 is selected as a major color, and the colors of the at least one second pixel 122 and the first pixel 121 are compared to determine a difference between them by an operation processing unit 20. The color of the at least one second pixel 122 is added into the major color when the difference is greater than a threshold. For example, the difference is obtained according to a square root of a sum of squares of the three primary colors, i.e., red, blue and green, and can be represented as equation (1) below:

$$\text{distance}(M_n, I_{x,y}) = \sqrt{(M_n - I_{x,y})^2} = \sqrt{(R_{M_n} - R_{I_{x,y}})^2 + (G_{M_n} - G_{I_{x,y}})^2 + (B_{M_n} - B_{I_{x,y}})^2} \quad (1)$$

In equation (1), $R_{M_n}$, $G_{M_n}$ and $B_{M_n}$ respectively represent color values of the red, green and blue primary colors in the major color, and $R_{I_{x,y}}$, $G_{I_{x,y}}$ and $B_{I_{x,y}}$ respectively represent color values of the red, green and blue primary colors in the at least one second pixel 122, so as to obtain the difference as a reference index of a color difference. Alternatively, the difference may be obtained according to a sum of absolute values of the color differences in the red, green and blue primary colors. By comparing the amount of the difference, equation (2) is obtained:

$$\text{distance}(M_n, I_{x,y}) = |(M_n - I_{x,y})| = |R_{M_n} - R_{I_{x,y}}| + |G_{M_n} - G_{I_{x,y}}| + |B_{M_n} - B_{I_{x,y}}| \quad (2)$$

In equation (2), a sum of absolute values of color differences is obtained, and can be calculated with simpler mathematical calculation.

In step S3, the numbers and color information of the major color in the blocks 12 are integrated and stored by the operation processing unit 20. The color information represents information associated with colors of the major color, e.g., red, blue and green, etc.

Figure 4:
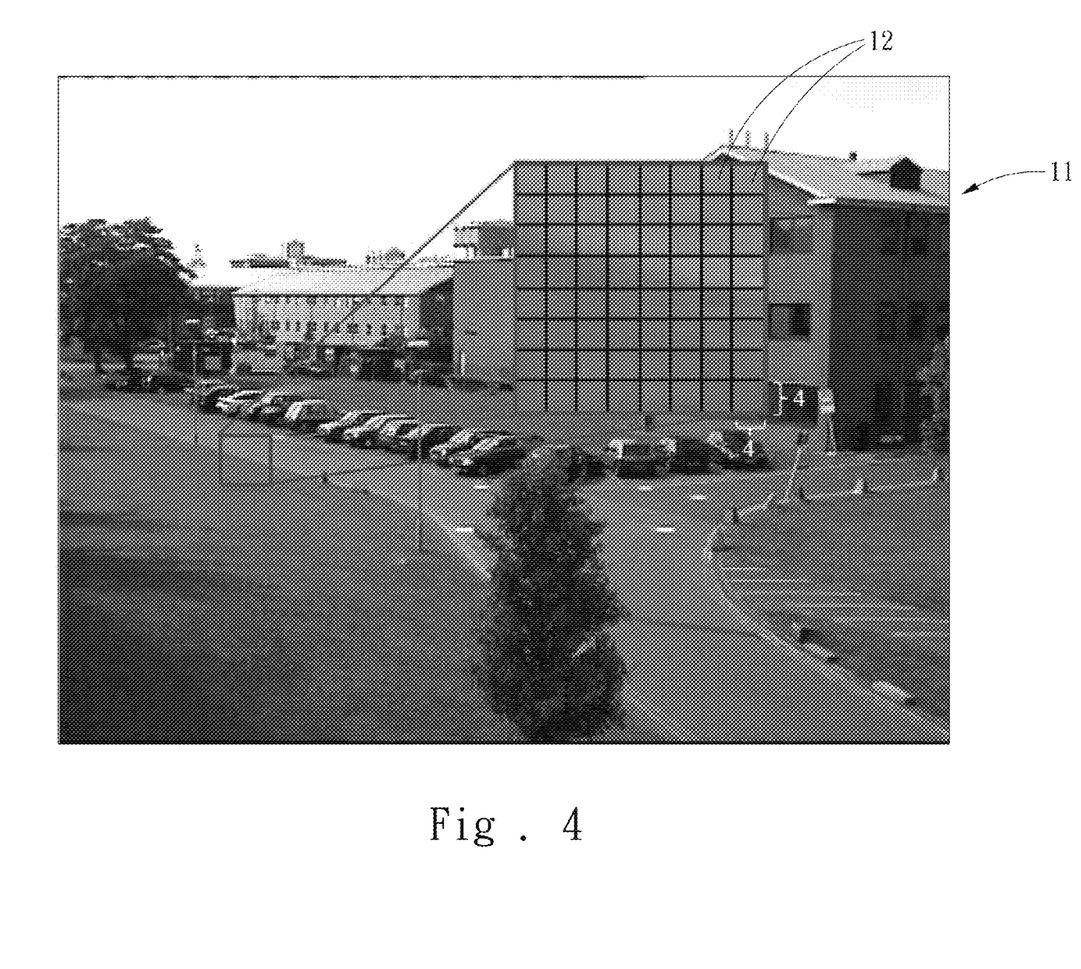
FIG. 4 is a schematic diagram of blocks of an image in a surveillance image of the present invention.
Figure 5A:
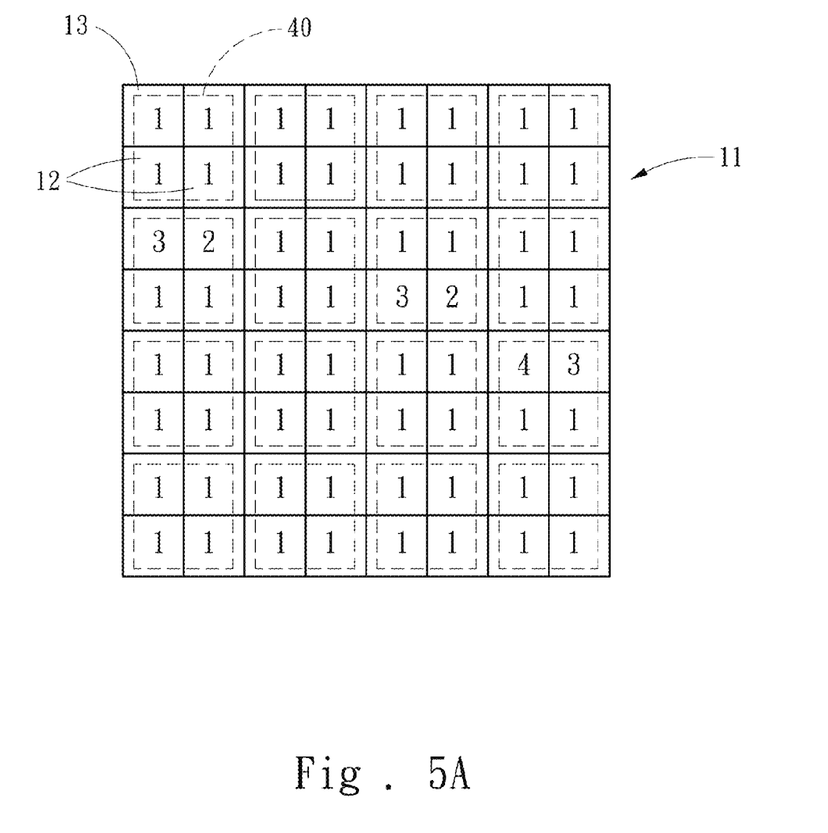
FIG. 5A is a schematic diagram showing number of a major color in blocks of the present invention.

In step S4, a threshold of each block 12 is determined. Referring to FIGS. 4 and 5A, a region having a matrix dimension of 32×32 pixels is selected for illustration and analysis. In the present invention, every 16 pixels are defined as one block 12. Thus, the region selected in FIG. 4 includes a matrix formed by 8×8 blocks 12. Referring to FIG. 5A, one of the blocks 12 is selected and is defined as an initial block 13, and the initial block 13 and the blocks 12 adjacent to the initial block 13 are jointly defined as a search region 40. In the embodiment, the block 12 at the upper-left corner is selected as the initial block 13, and the initial block 13 and the three blocks 12 adjacent to the initial block 13 are jointly defined as the search region 40. Every four blocks 12 are similarly defined as one search region 40 to altogether form 16 search regions 40. When the number of the major color in the initial block 13 is smaller than a block threshold, the operation processing unit 20 reorganizes and integrates the number and color information of the major color in the search region 40. In FIG. 5A, the number in each of the blocks 12 represents the number of the major color therein. More specifically, in the reorganization and integration performed by the operation processing unit 20, the operation processing unit 20 obtains the number and color information of the major color in the search region 40 by again performing the determination process in steps S2 and S3 as the search region 40 is a new unit. The color of the major color of each of the search regions 40 may differ from one another. Therefore, the number of the major color in the search region 40 may also change after the reorganization and integration performed by the operation processing unit 20, and so the reorganization and integration are required. When the number of the major color in the initial block 13 is greater than the block threshold, the comparison and determination process for a next search region 40 is directly performed. That is to say, when the number of the major color in the initial block 13 is large enough, it means that the color difference in the initial block 13 is quite high. As such, no reorganization and integration are needed to be performed, and so the comparison and determination for the next search region 40 can be directly performed.

Figure 5B:
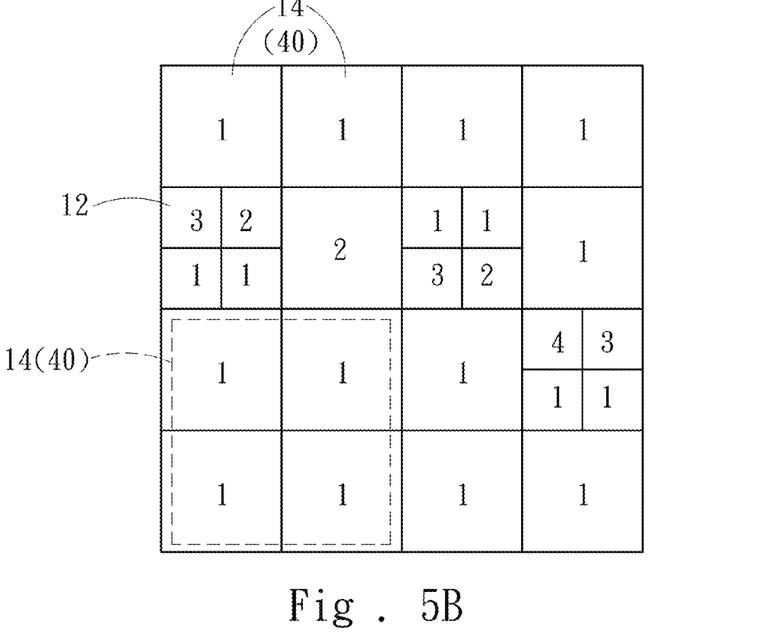
FIG. 5B is a schematic diagram of merging blocks of the present invention.

In step S5, the blocks 12 are merged. Referring to FIG. 5B, when the number of the major color in the search region 40 is smaller than a region threshold, the search region 40 is merged into a large block 14. As shown in FIG. 5B, the numbers of the major color in the upper-row search regions 40 are both 1, indicating that the color differences in pixels in these regions are not large. Thus, the search regions 40 are merged into one large block 14 to reduce a load on the memory. When the number of the major color in the search region 40 is greater than the region threshold, the search region 40 is not merged, and the comparison and determination for a next search region 40 is directly performed.

Figure 5C:
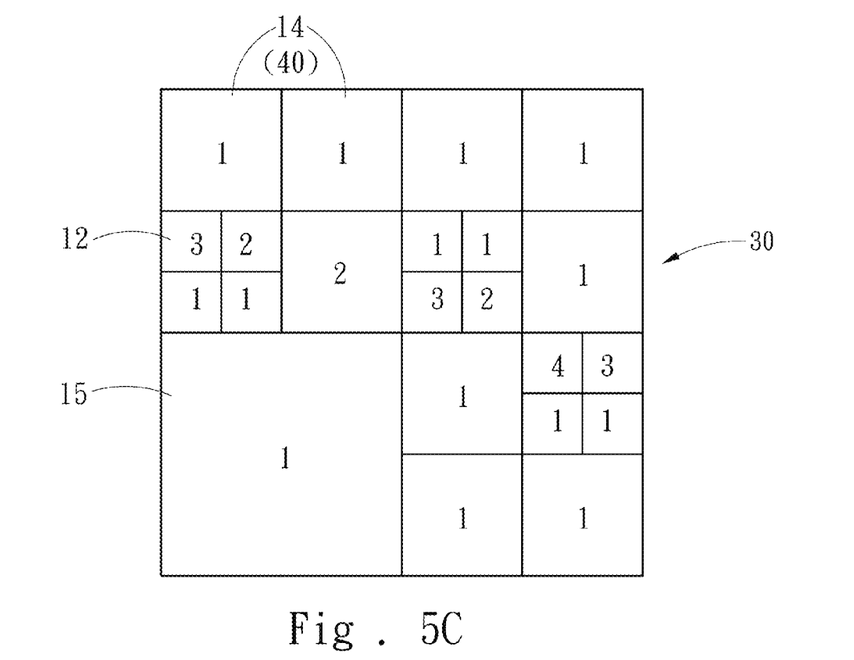
FIG. 5C is a schematic diagram of a block background model of the present invention.

In step S6, the analysis on the surveillance image 11 is completed, and steps S4 and S5 are sequentially repeated to obtain a block background model 30 of the surveillance image 11. The numbers of the major color in the four lower-left regions 40 are also 1, and so, in addition to respectively merging the four regions into large blocks 14, the four large blocks 14 are merged into a mega block 15. FIG. 5C shows a final block background model 30.

In step S7, detection on a moving object image is performed. Referring to FIG. 2, the surveillance apparatus 10 inputs a new surveillance image to perform color comparison between the new surveillance image and the block background model 30. When a difference of the color comparison is large, a moving object image is determined and obtained. More specifically, according to the data of the block background model 30, the operation processing unit 20 compares the image corresponding to the newly inputted surveillance image. When the color comparison result of the new surveillance image matches the block background model 30, the new surveillance image is determined as the background, which is then displayed in black after being converted and outputted to surveillance personnel. When the color comparison result of the new surveillance image indicates a large color difference in the colors between the new surveillance image and the block background model 30, it is determined that the new surveillance image is a foreground, which is then displayed in white or in colors.

In step S8, the moving object image is updated. A pixel in each of the blocks 12 in the large block 14 is extracted, and is compared with a corresponding position of the pixel in the new surveillance image. When the comparison results do not match, data in the blocks 12 is updated. As the blocks 12 are updated in a unit of the blocks 12 of the moving object image, patterns in the foreground displayed (the moving object image) are also updated in a unit of blocks. Thus, in the large block 14, it is frequent that image patterns are incorrectly or incompletely segmented to cause an incorrect actual image displayed in the block 12. Therefore, in this step, one pixel in each of the blocks 12 in the large block 14 is randomly extracted for comparison. When the comparison result matches the new surveillance image, the comparison process for a next block 12 is performed. When the comparison results do not match, the color information of the block 12 is updated according to the new surveillance image. As such, the large block 14 can be included, and is verified and updated by an omitted moving object image, thereby reinforcing the capability of correctly displaying the moving object image.

Figure 6A:
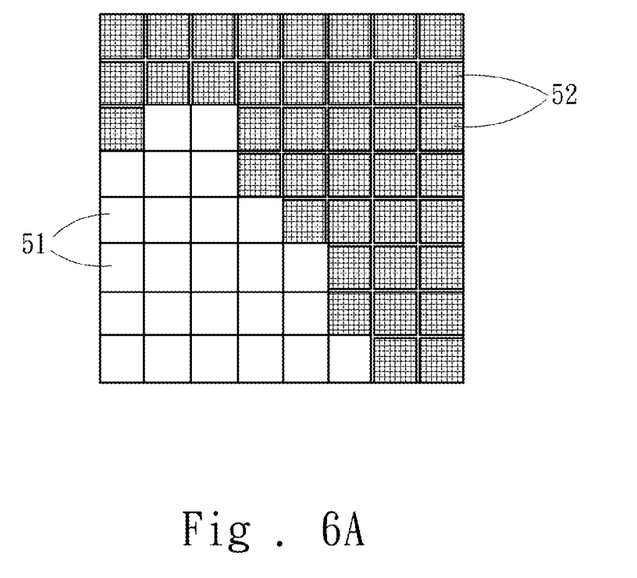
FIG. 6A is a schematic diagram of a border of a moving object image of the present invention.
Figure 6B:
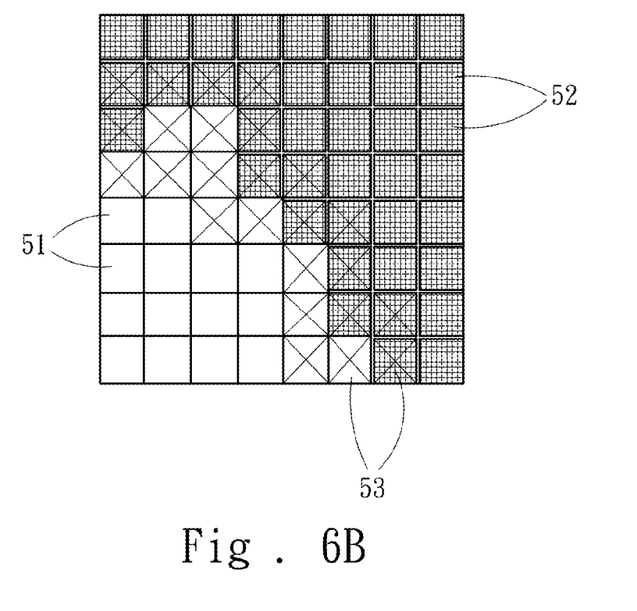
FIG. 6B is a schematic diagram of updating a moving object image of the present invention.

In step S9, a refinement treatment is performed on the moving object image. Referring to FIGS. 6A and 6B, white blocks 51 in FIG. 6A represent pixels of the moving object image, and shaded blocks 52 represent background pixels. As shown in FIG. 6B, in the refinement treatment, border regions 53 of the moving object image are compared with corresponding positions in the new surveillance image, and the pixels are updated for the refinement treatment.

It is discovered from comparisons on experimental results that, compared to "Real-Time Foreground-Background Segmentation using Codebook Model" (to he referred to as the Codebook method) disclosed in Real-Time Imaging, pp. 172-185, 2005 by Kyungnam Kim et al., for 160×120 pixels, 91% similarity to an original image is achieved by utilizing the Codebook method, whereas 92% similarity is achieved by the method disclosed by the present invention. For 768×576 pixels, 63% similarity to an original image is achieved by utilizing the Codebook method, whereas 69.7% similarity is achieved by the method disclosed by the present invention. Therefore, with respect to image analysis capabilities, the method disclosed by the present invention is preferred over the Codebook method of the prior art.

By comparing the memory utilization rate, for 160×120 pixels, the Codebook method occupies 1.11 MB in memory, whereas the present invention occupies only 0.13 MB in memory, which is only about 1/10 of the Codebook method. For 768×576 pixels, the Codebook method occupies 17.7 MB in memory, whereas the present invention occupies only 0.3 MB in memory, which is far reduced to only 1/60 of the Codebook method.

In conclusion, the present invention offers the advantages below.

First of all, the major color is utilized as a basis for mutual comparison to reduce the system memory capacity load. Secondly, with the determination mechanism of the block threshold and the region threshold, different-sized block background models are established to effectively further reduce the utilization amount of the memory. Thirdly, as the load on the memory system is reduced, the computer is allowed to more efficiently perform data computation to enhance computation performance. Further, the pixels in the large block are randomly extracted and compared to update the moving object image, such that erroneous images resulted by incorrect or incomplete image segmentation are mitigated. Moreover, the image display capability is reinforced by the refinement treatment to enhance image recognition.

What is claimed is:

1. A method of establishing an adjustable-block background model for detecting a real-time image object, which obtains a surveillance image by a surveillance apparatus, the method comprising steps of:
    S1) segmenting the surveillance image into a plurality of blocks, each of which comprising a first pixel and at least one second pixel;
    S2) selecting a color of the first pixel as a major color, and determining a difference between color of the at least one second pixel and the color of the first pixel by an operation processing unit, and adding the color of the at least one second pixel into the major color when the difference is greater than a threshold;
    S3) determining a number and color information of the major color in each of the blocks by the operation processing unit, and storing the determined number and color information;
    S4) selecting and defining one of the blocks as an initial block, and defining the initial block and the blocks adjacent to the initial block as a search region; when the number of the major color in the initial block is smaller than a block threshold, reorganizing and integrating the number and the color information of the major color in the search region by the operation processing unit;
    S5) when the number of the major color in the search region is smaller than a region threshold, merging the search region into a large block;
    S6) completing analysis on the surveillance image, and sequentially repeating the steps S4 and S5 to obtain a block background model of the surveillance image;
    S7) inputting a new surveillance image by the surveillance apparatus, and performing color comparison between the new surveillance image and the block background model; and
    obtaining a moving object image when a color comparison result indicates a large difference; and
    S8) extracting a pixel in each of the blocks in the large block and comparing with a corresponding position in the new surveillance image; and updating data of the blocks when a pixel comparison result does not match.

2. The method of claim 1, wherein the pixel in each of the blocks of the large block is randomly extracted and compared; a comparison process for a next block is performed when a comparison result matches the new surveillance image, or the color information of the block is updated when the comparison result does not match.

3. The method of claim 1, wherein in the step S4, one search region includes four blocks which are sequentially determined with the block threshold.

4. The method of claim 1, wherein in the step S2, the difference is obtained according to a square root of a sum of squares of red, green and blue primary colors.

5. The method of claim 1, wherein in step S2, the difference is obtained according to a square root of a sum of squares of color differences between red, green and blue primary colors.

6. The method of claim 1, after the step S7, further comprising:
    S9) performing a refinement treatment on the moving object image, and comparing a border region of the moving object image with a corresponding position in the new surveillance image to complete the refinement treatment.

* * * * *